United States Patent
Henzler et al.

(10) Patent No.: US 7,264,651 B2
(45) Date of Patent: Sep. 4, 2007

(54) ADSORPTION PROCESS AND SYSTEM USING MULTILAYER ADSORBENT BEDS CONTAINING REGENERATOR SECTION

(75) Inventors: Gregory William Henzler, East Amherst, NY (US); Jeffert John Nowobilski, Orchard Park, NY (US); Mark William Ackley, East Aurora, NY (US); Michael George Noakes, North Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 161 days.

(21) Appl. No.: 10/882,620

(22) Filed: Jul. 2, 2004

(65) Prior Publication Data

US 2006/0000354 A1   Jan. 5, 2006

(51) Int. Cl.
*B01D 53/047* (2006.01)
(52) U.S. Cl. ............................. 95/96; 95/117; 96/130; 96/131; 96/143
(58) Field of Classification Search .................. 95/96, 95/106, 117, 148; 96/108, 121, 130, 131, 96/143
See application file for complete search history.

(56) References Cited

U.S. PATENT DOCUMENTS

| | | | | |
|---|---|---|---|---|
| 4,372,857 A | * | 2/1983 | Matthews et al. | 210/673 |
| 4,472,178 A | | 9/1984 | Kumar et al. | 55/25 |
| 5,169,413 A | | 12/1992 | Leavitt | 55/25 |
| 5,674,311 A | | 10/1997 | Notaro et al. | 95/96 |
| 5,989,314 A | | 11/1999 | Schaub et al. | 95/96 |
| 6,027,548 A | * | 2/2000 | Ackley et al. | 95/96 |
| 6,334,889 B1 | * | 1/2002 | Smolarek et al. | 96/149 |
| 2005/0252374 A1 | * | 11/2005 | Henzler et al. | 95/96 |

OTHER PUBLICATIONS

Jun Imuzi et al, "High Efficiency Oxygen Separation With the Low Temperature and Low Pressure PSA", Nov. 1989, p. 1-10, A.I.Ch.E, San Francisco, CA.

* cited by examiner

*Primary Examiner*—Frank M. Lawrence
(74) *Attorney, Agent, or Firm*—Flora W. Feng

(57) ABSTRACT

For PSA or TSA prepurifiers, the temperature rise on adsorption is particularly troublesome when the temperature rise reaches the end of the bed at the end of the adsorption step. This results in an increase in the $CO_2$ and $N_2O$ concentration at the end of the cycle. Addition of a regenerator in the middle of the adsorption layer will reduce the temperature rise at the end of the bed and thus enhance the performance of the bed.

16 Claims, 4 Drawing Sheets

ADSORPTION PROCESS AND SYSTEM USING MULTILAYER ADSORBENT BEDS CONTAINING REGENERATOR SECTION

BACKGROUND OF THE INVENTION

1. Field of the Invention

The invention relates to a gas separation and more particularly, it relates to the enhanced production of oxygen from air.

2. Description of the Prior Art

Cryogenic separation of air requires a pre-purification step to remove contaminants such as water, $CO_2$ and hydrocarbons from air. In cold sections of the separation process (such as heat exchangers and the main condenser), water and $CO_2$ can solidify and block the heat exchangers or other components in the distillation columns. Acetylene and other hydrocarbons in air present a potential hazard. The high boiling hydrocarbons can accumulate in the liquid oxygen and create an explosion hazard. Thus, those impurities in air must be removed prior to the cryogenic distillation of air. One method to remove the air contaminates is to use an adsorptive process on the pressurized feed air stream. The prepurification system removes the above impurities using a thermal swing (TSA) or a pressure swing (PSA) adsorption process. There is always a desire to reduce the cost of the prepurification process through improved adsorbents, process or equipment modifications. An improvement in the PSA process through the introduction of a regenerator in the adsorption bed in order to control the internal bed temperatures is desired to achieve improved adsorption of $CO_2$, $N_2O$, and hydrocarbons and also better regeneration of the water adsorbent.

It is now believed that nitrous oxide ($N_2O$) also should be removed from air prior to separation. $N_2O$ is present in air at a concentration of about 300-375 ppb. The presence of $N_2O$ can be a serious problem for cryogenic air separation units (ASU) because it can form solid deposits in the primary heat exchangers or the main condenser of the distillation system. This can result in degraded performance and can even cause blockage of heat exchangers. Therefore, to avoid these problems, it is advisable to remove $N_2O$ to a level below about 50 ppb prior to the cold box in cryogenic air separation units. Wenning ("Nitrous Oxide in Air Separation Plants" *Proceedings from MUST* 1996, pp. 79-89) has described this problem in detail. $N_2O$ is inert in liquid oxygen, however, it can become quasi-permanently present in the distillation column and potentially freeze there unless removed by costly periodic liquid oxygen drainage. $N_2O$ also decreases the solubility of $CO_2$ in liquid oxygen, thereby increasing the potential for freezing of $CO_2$ in the distillation columns.

Air prepurification can be accomplished using pressure swing adsorption (PSA), temperature swing adsorption (TSA) or a combination of both (TSA/PSA) incorporating either a single adsorbent or multiple adsorbents. When more than one adsorbent is used, the adsorbents may be configured as discrete layers, as mixtures, composites or combinations of these. Impurities such as $H_2O$ and $CO_2$ are commonly removed from air using two adsorbent layers in a combined TSA/PSA process. Normally, a first layer of activated alumina is used for water removal and a second layer of 13X molecular sieve is used for $CO_2$ removal. Prior art, such as U.S. Pat. No. 4,711,645, teaches the use of various adsorbents and methods for removal of $CO_2$ and water vapor from air in a PSA process.

U.S. Pat. No. 5,169,413 relates to pressure swing adsorption gas separation gas operations that are enhanced by the retention and use of internal refrigeration effects, without the need for externally supplied refrigeration.

U.S. Pat. No. 5,674,311 relates to an adsorption process and system for the selective adsorption of a more readily adsorbable component, such as nitrogen, as from air or other feed gas mixture is carried out using a composite adsorbent bed containing different adsorbent material positioned in separate zones in which the temperature conditions favor adsorption performance of the particular adsorbent material under applicable processing conditions in each zone. A method for the selection of the adsorbent materials is based on Adsorption Figure of Merit values.

U.S. Pat. No. 5,989,314 relates to a pressure swing adsorption air prepurifier that is used to remove water, carbon dioxide and hydrocarbons from a feed gas stream, such as a feed air stream, passing to a cryogenic air separation plant. By the incorporation of a regenerative heat exchange as an integral part of the air prepurifier, the cooling effects of the desorption of water are stored and transferred so as to cool the incoming feed air stream passing to the adsorbent material within the air prepurifier. The productive capacity of the adsorbent material is enhanced thereby.

U.S. Pat. No. 4,472,178 relates to a process that is set forth for the removal of carbon dioxide from air in an adsorption bed wherein the regeneration energy is reduced by the use of a heat recuperator and a purge sequence which avoids the removal of heat from the adsorption bed during regeneration.

Izumi, Jun, "High Efficiency Oxygen Separation With The Low Temperature and Low Pressure PSA," November 1989, pp. 1-10, A. I. Ch. E., San Francisco, Calif. discusses the use of a regenerator section after the water removal section and before the nitrogen removal section of an $O_2$ VPSA system.

The design of a regenerator is known in the published literature. Two such references are:

Kays, W. M. and London, A. L., "Compact Heat Exchangers", $2^{nd}$ ed., McGraw-Hill, New York, 1964.

Furnas, C. C., "Heat Transfer From a Gas Stream to a Bed of Broken Solids," Ind. Eng. Chem., Vol. 22 1930.

An objective of the present invention is to improve the performance of a PSA, TSA or PSA/TSA prepurifier to remove contaminates such as $CO_2$ and $N_2O$ from the air stream prior to cryogenic separation. Preferable, a method of this invention can be used to improve the performance of any PSA gas separation process where there are large temperature changes in the bed due to the adsorption of one or more of the gas species in the feed stream. Such species could be water vapor, $CO_2$, ammonia, hydrogen sulfide, sulfur dioxide, etc. Examples of these processes are $CO_2$ removal and drying of natural gas, and $CO_2$ removal and drying of syngas streams or in hydrogen PSA.

It is another object of the invention to provide an improved PSA process and apparatus for the production of oxygen from air, and other desirable gas separations.

It is a further object of the invention to provide a PSA process and system for enhancing the overall efficiency and economy of oxygen production from feed air.

With these and other objects in mind, the invention is hereinafter described in detail, the novel features thereof being particularly pointed out in the appended claims.

SUMMARY OF THE INVENTION

This invention relates to a swing adsorption process for the separation of at least one less readily adsorbable component in a cyclic adsorption/desorption sequence comprising:

(a) positioning a regenerator section in an adsorbent bed contained in at least one adsorption vessel and said regenerator placed after a water zone in the adsorbent bed;

(b) passing a feed gas mixture to a feed end of said at least one adsorption vessel and through the bed containing at least one adsorbent material and said regenerator at its upper adsorption end or location, said adsorbent material being capable of selectively adsorbing the at least one readily adsorbable compound of the feed gas mixture and said regenerator section being capable of reducing any temperature rise in the selected adsorbent material bed;

(c) withdrawing the at least one less readily adsorbable component from a withdrawer end of the at least one adsorption vessel; and (d) repeating steps (a) and (c).

Another embodiment of the invention relates to a swing adsorption system for the separation of at least one more readily adsorbable component of a feed gas mixture containing said component and at least one less readily adsorbable component comprising:

(a) at least one adsorption vessel containing a bed of at least one adsorbent material capable of selectively adsorbing the at least one more readily adsorbable component of the feed gas mixture;

(b) a regenerator section as part of the adsorbent bed and placed after the adsorbent material which is adaptable for removing water and said regenerator which is adaptable for reducing any temperature rise in the adsorbent bed at such water zone;

(c) means adaptable for passing a feed gas mixture to a first feed end of the adsorption vessel; and (d) means adaptable for withdrawing the less readily adsorbable component from the vessel.

The regenerator is placed in the bed and sized such that the total system is cost effective. Even though the bed may be made of multiple layers of adsorbent material, the optimal placement of the regenerator could be anywhere in the bed and not necessarily between any two layers of adsorbent. The adsorbent beds used in the method of the invention can have a variety of configurations such as vertical beds, horizontal beds or radial beds and can be operated in a pressure swing adsorption mode, temperature swing adsorption mode, vacuum swing adsorption mode or a combination of these. Although pure pressure or vacuum swing process would be the preferred cycle.

The preferred regeneration material and geometry are ceramic balls ranging in size from $\frac{1}{16}$" to $\frac{1}{2}$", preferably about $\frac{1}{8}$" to about $\frac{1}{4}$" but larger or smaller size could be used depending on the application. The material could also be metal or plastic rather than ceramic. Preferably, the material should have high density, and good heat capacity. The balls could be made of an encapsulated phase change material such that the phase change is within the operating temperature change of the regenerator. Regenerator configurations are possible such as stacked screens, crushed stones, extruded monoliths, or corrugated metals or plastics.

Air prepurifiers (PP) are designed for the complete or partial removal of $H_2O$, $CO_2$, $C_3H_8$, $C_2H_2$, C4+, $N_2O$, NOx and other contaminants. Water is the most strongly held contaminant. Current PP designs (both TSA and PSA) remove virtually all of the $H_2O$ in the lower section (activated alumina) of the compound adsorbent bed. As water adsorbs onto the adsorbent, the heat of adsorption causes the bed temperature to rise. This heat is carried up through the bed increasing the temperature of the adsorbent downstream of the water zone. As the temperature rises in the bed, the capacity of the downstream adsorbents to hold contaminants is reduced. In fact, as the temperature front passes further into the bed the adsorbent will liberate previously adsorbed species. As the temperature rises in the bed, it is quite evident that $N_2O$ and $CO_2$ breakthrough increases. Both the $N_2O$ and $CO_2$ breakthrough closely follow the temperature swing in the upper portion of the bed during the last half of a cycle. The amount of $CO_2$ and $N_2O$ breakthrough is directly affected by changes in the adsorbent temperature. It is also believed that other contaminants including $C_2H_2$ and $C_3H_8$ will adversely be affected by this temperature front.

To improve the performance of a PSA air prepurifier for $N_2O$, $CO_2$, $C_3H_8$ and other contaminant removal, a regenerator is added to the air prepurifier. The regenerator should be located downstream of the $H_2O$ adsorption zone in order to store the energy resulting from the heat of adsorption of water. This will in turn reduce the temperature rise in the upper part of the adsorbent bed thus increasing the capacity of these downstream adsorbent(s) to adsorb contaminants. A preferable regenerator layer is at the alumina/CDX interface. Optimization of the layer may move its location into either the alumina or CDX adsorbent layer. On countercurrent regeneration the stored heat would be transferred back into the $H_2O$ zone aiding in $H_2O$ desorption. In addition, the regenerator would store refrigeration caused primarily by $N_2$ desorption during blow down.

Thus the general problem to be solved is to improve the performance of an existing prepurification adsorbent system by manipulating the internal temperature distribution in the bed through the use of an internal regeneration layer. The regenerator size and placement in the bed will depend on the process cycle time, flow rates and the overall economics of the process. The addition of an inert regenerator layer will add cost due to the pressure drop and the material cost of the regenerator. The use of the regenerator layer will either reduce contaminant level at the end of the cycle or the bed can be made smaller for the same impurity concentration. In a PSA air prepurification application, the contaminates of interest are $CO_2$, $N_2O$, $H_2O$ and $C_2H_2$. In a process for removal of contaminants from a gas mixture by adsorption, it is common to adsorb contaminants successively in the order of decreasing adsorptivity and/or decreasing selectivity with respect to a chosen adsorbent. The effectiveness of such a process can often be improved by using a combination of adsorbents, configured in layers or mixtures, to enhance the removal of each contaminant, i.e. by selecting particular adsorbents to achieve maximum adsorptivity and/or selectivity of each contaminant relative to the gas mixture. The use of different adsorbents disposed in layers in the adsorber is well known in the art. The selection of an adsorbent to remove a particular contaminant depends upon many factors, e.g. the type and composition of both the targeted contaminant and other gases in the mixture at the point of removal within the adsorber, the relative selectivity of the adsorbent for the contaminant(s) and non-contaminants, and the loading capacity of the adsorbent for the contaminant.

Prior art has dealt with improving the adsorbents to work better in the existing thermal environment or selecting existing adsorbents to work better in a given thermal profile in a vessel.

This invention provides a simple and efficient way to passively modify the temperature levels in the bed and improve the performance of an adsorbent system in a PSA application. In particular the invention is preferably suited for PSA air prepurifiers used in air separation plants where large temperature gradients, generated due to the adsorption of water, could be smoothed out. The cost to implement the invention is the added pressure drop of the regenerator layer and the cost of the regenerator layer. The lower impurities or the smaller bed size for the same impurity level will offset this cost. The cost of the power and the worth of the product or the worth of the higher product purity level determine the sizing. The power cost is determined by the plant location. An alternative to making the bed smaller is to use the improved performance to increase the safety margin of the prepurifier to plant upsets or feed $CO_2$ increases.

BRIEF DESCRIPTION OF THE DRAWINGS

The invention is hereinafter further described with reference to the accompanying drawings in which:

The invention was recognized by observing the movement of the peak temperatures along the length of the bed and the product $CO_2$ and $N_2O$ level. It was observed that the product $CO_2$ and $N_2O$ level were strongly influenced by the temperature level at the end of the bed and if the peak bed temperature reached the end of the bed at the end of the cycle, the $CO_2$ and $N_2O$ increased to higher levels than expected. FIG. 1 shows the effect measured in a test on a lab pilot plant PSA prepurifier. The coincidence of temperature and high product $CO_2$ and $N_2O$ level can clearly be seen. Therefore if at the end of a cycle peak temperature at the end of the bed can be reduced, the impurities in the product air can be reduced. The placement of a well-designed regenerator layer near the end of the bed will reduce the temperature in the final portion of the bed at the end of the cycle and hence the level of the $CO_2$ and $N_2O$ in the product. This reduction will incur a cost due to the material cost of the regenerator, the pressure drop cost and the added void volume cost.

The design of the regenerator section will depend on the material of construction. Typical regenerator materials are metal or ceramic screens, spheres, and corrugations. Typically screens have a high efficiency but a high material and installation cost. Ceramic spheres have a lower efficiency but a very low material and installation cost. Solid or tubular alumina spheres 1/8" to 1/4" are the preferred regenerator material. The regenerator length will depend on the prepurifier cycle time, mass flux of the feed and purge and types of adsorbent in the bed. For typical PSA prepurifiers, the regenerator length will be between 3 inches and 36 inches, and preferably between 12 inches and 18 inches. The location of the regenerator layer will also depend on the prepurifier cycle time, mass flux of the feed and purge and types of adsorbent in the bed. For typical PSA prepurifiers, the regenerator will be located between 3 inches and 60 inches from the product end of the bed and preferably between 6 inches and 36 inches from the product end of the bed. The location and length are optimized to produce the maximum temperature depression at the product end of the bed and hence the greatest reduction in the $CO_2$ and $N_2O$ concentration in the product over the cycle for the minimum cost.

Figure 1:
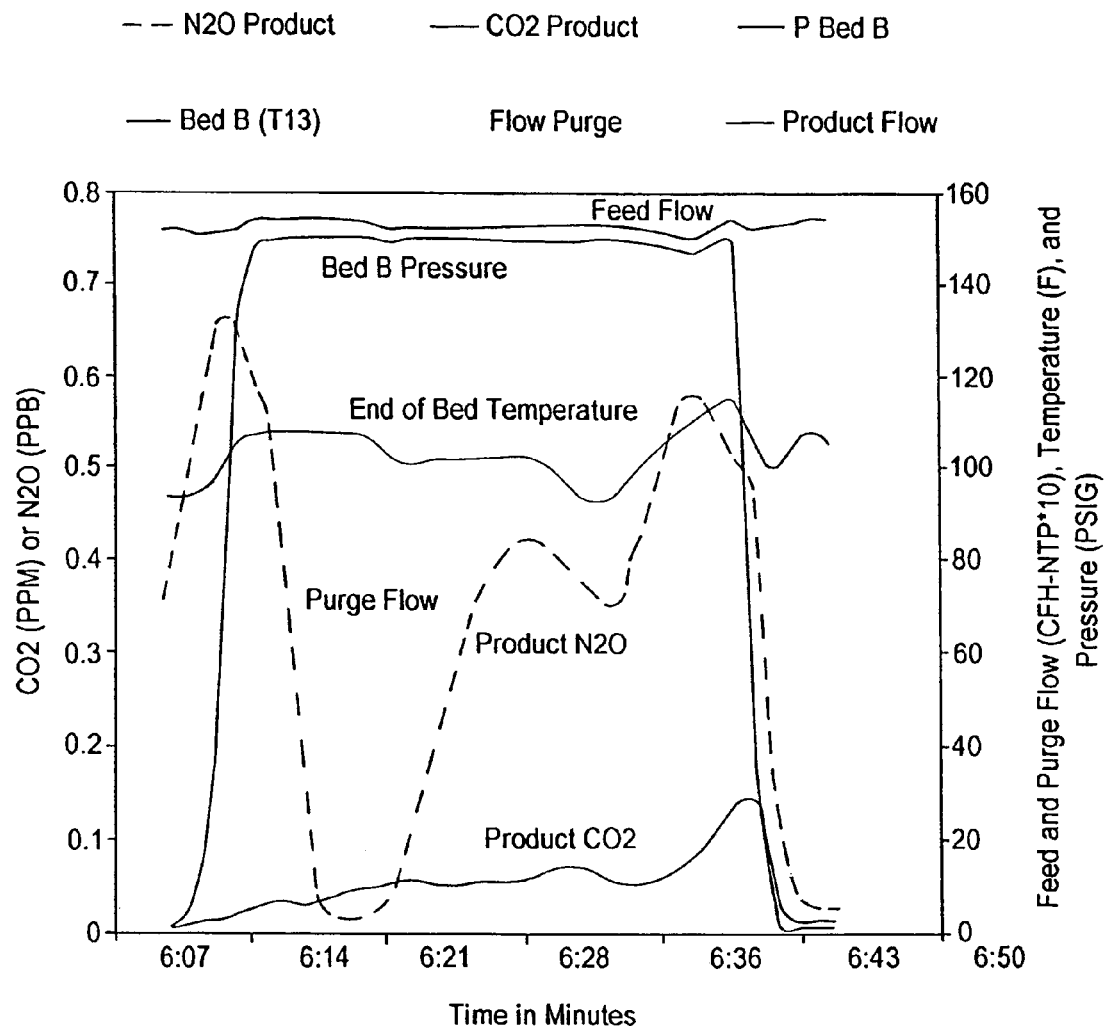
FIG. 1 is a plot of the end of bed temperature and $CO_2$ and $N_2O$ product concentrations during feed step.
Figure 2:
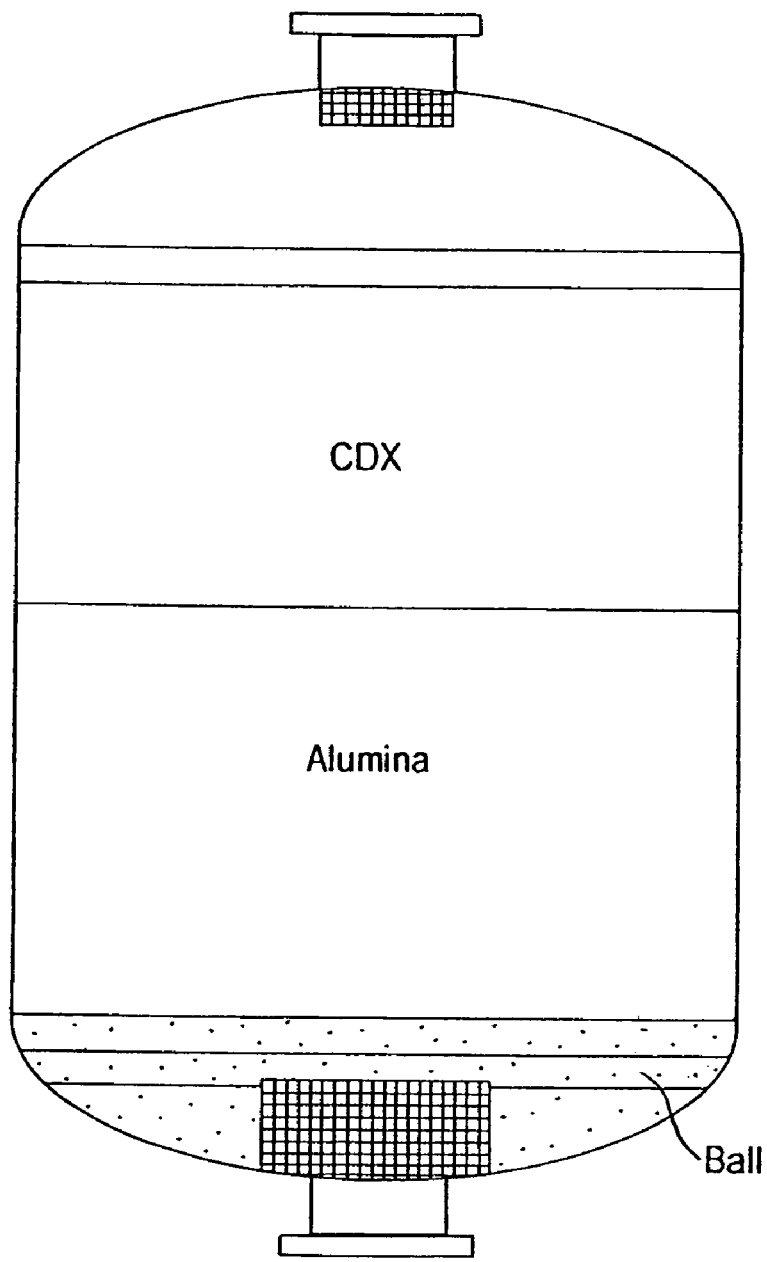
FIG. 2 is a schematic drawing of an embodiment of a typical prepurifier design without a regenerator section.
Figure 3:
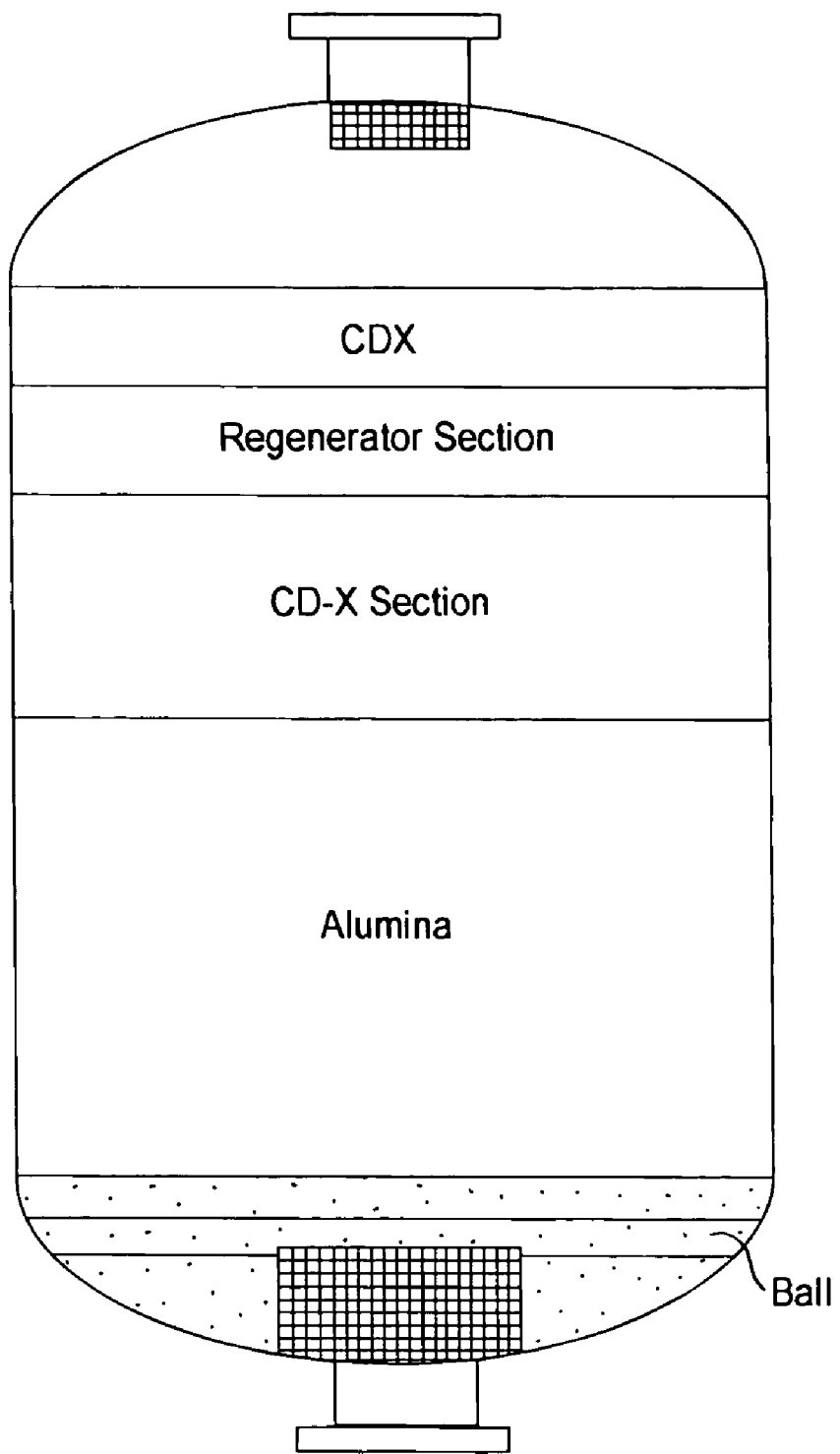
FIG. 3 is a schematic drawing of an embodiment of a prepurifier design with a regenerator section in accordance with the invention.
Figure 4:
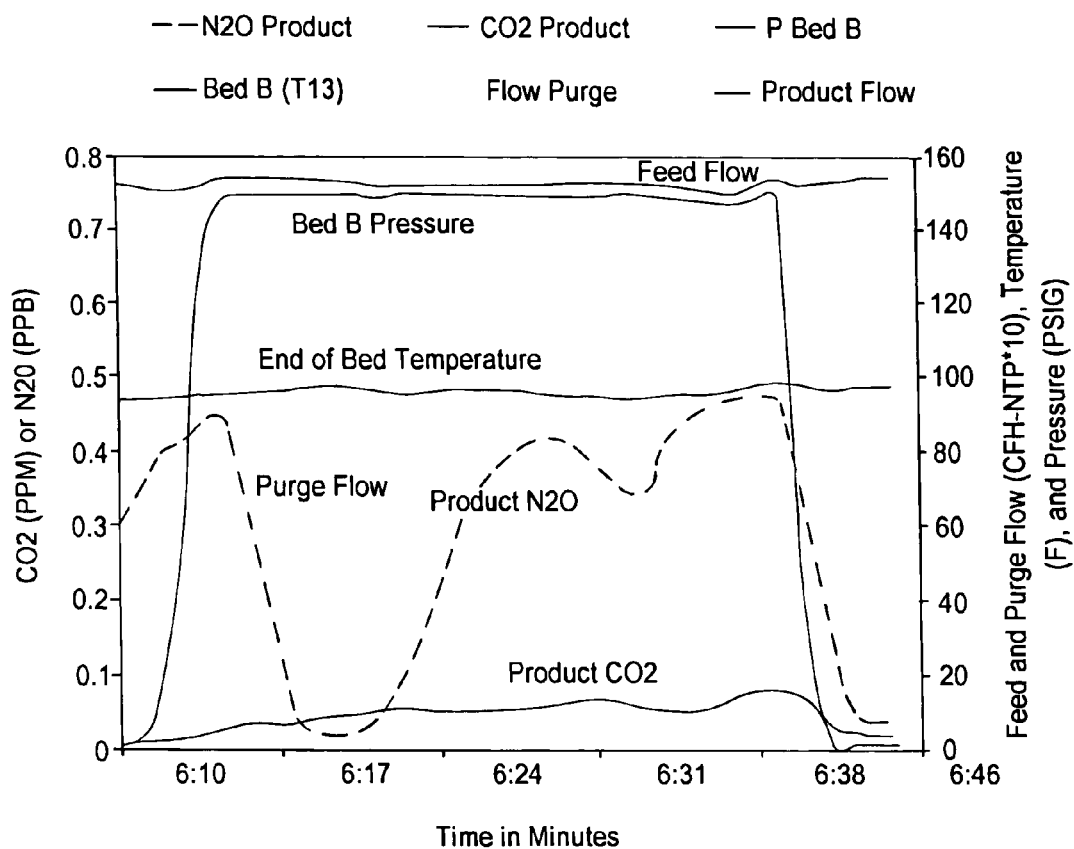
FIG. 4 is a plot of the end of bed temperature and $CO_2$ and $N_2O$ product concentrations during feed step.

A typical PSA prepurifier will be a vertical cylindrical vessel between 3-ft. to 4-ft. diameter and have an active bed depth of 90 inches. The flow rate through the bed will range from 60,000 to 2,800,000 NCFH. The bed purge to feed ratio will be between 30% and 60%. The cycle time will range from 10 to 30 minutes. The adsorbent materials are activated alumina in the lower section of the bed and alumina/zeolite composite such as CDX manufactured by Alcoa in the upper section of the bed. CDX is made of 40% sodium type of zeolite (NaY) and 60% activated alumina. A typical bed layout is shown in FIG. 2. Preferably, the prepurifier incorporating the regenerator is shown in FIG. 3. This regenerator is 12 inches long and is located 12 inches from the product end of the bed. Comparing FIG. 1 which is the lab data without the regenerator, the addition of the regenerator is expected to reduce the product end temperature and the product $CO_2$ concentration as shown in FIG. 4. The $CO_2$ level is expected to be reduced from 0.15 to 0.08 ppm and the $N_2O$ level is reduced from 0.58 to 0.48 ppb.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed:

1. A swing adsorption process for the separation of at least one more readily adsorbable component of a feed gas mixture containing said component and at least one less readily adsorbable component, in a cyclic adsorption/desorption sequence comprising:
    (a) positioning a regenerator material section in an adsorbent bed contained in at least one adsorption vessel wherein said regenerator material section is placed downstream of a water adsorption zone in the adsorbent bed;
    (b) passing the feed gas mixture to a feed end of said at least one adsorption vessel and through the adsorbent bed containing at least one adsorbent material and said regenerator material section, said adsorbent material being capable of selectively adsorbing the at least one readily adsorbable component of the feed gas mixture and said regenerator material section being capable of reducing any temperature rise in the adsorbent material downstream of the regenerator material section; and
    (c) withdrawing the at least one less readily adsorbable component from a withdrawer end of the at least one adsorption vessel;
wherein the regenerator material is an encapsulated phase change material.

2. The swing adsorption process of claim 1 wherein the feed gas is air.

3. The swing adsorption process of claim 1 wherein the operation of the adsorption vessel is selected from a group consisting of pressure swing adsorption mode, temperature swing adsorption mode, vacuum swing adsorption mode and combinations thereof.

4. A swing adsorption process for the separation of at least one more readily adsorbable component of a feed gas mixture containing said component and at least one less readily adsorbable component, in a cyclic adsorption/desorption sequence comprising:

(a) positioning a regenerator material section in an adsorbent bed contained in at least one adsorption vessel wherein said regenerator material section is placed downstream of a water adsorption zone in the adsorbent bed;

(b) passing the feed gas mixture to a feed end of said at least one adsorption vessel and through the adsorbent bed containing at least one adsorbent material and said regenerator material section, said adsorbent material being capable of selectively adsorbing the at least one readily adsorbable component of the feed gas mixture and said regenerator material section being capable of reducing any temperature rise in the adsorbent material downstream of the regenerator material section; and (c) withdrawing the at least one less readily adsorbable component from a withdrawer end of the at least one adsorption vessel;

wherein the adsorbent material is a layer of activated alumina below a layer of alumina/zeolite composite.

5. The swing adsorption process of claim 4 wherein the regenerator material is selected from the group consisting of metal, ceramic and plastic.

6. The swing adsorption process of claim 5 wherein the regenerator material has a configuration selected from the group consisting of stacked screens, spheres, crushed stones, extruded monoliths and corrugated metals, ceramic or plastics.

7. The swing adsorption process of claim 5 wherein the regenerator material is in the form of ceramic balls ranging in size from 1/16 inch to 1/2 inch.

8. The swing adsorption process of claim 4 wherein the regenerator material is solid or tubular alumina spheres sized between about 1/8 inch to about 1/4 inch.

9. The swing adsorption process of claim 4 wherein the alumina/zeolite composite comprises two layers and the regenerator material section is a layer sandwiched between said alumina/zeolite composite layers.

10. A swing adsorption system for the separation of at least one more readily adsorbable component of a feed gas mixture containing said component and at least one less readily adsorbable component comprising:

(a) at least one adsorption vessel containing an absorbent bed comprising at least one adsorbent material capable of selectively adsorbing the at least one more readily adsorbent component of the feed gas mixture;

(b) a water zone within the adsorbent bed comprising an adsorbent material which is adaptable for removing water;

(c) a regenerator section within the adsorbent bed and placed downstream of the water zone, wherein said regenerator section is adaptable for reducing any temperature rise in the adsorbent bed at such water zone;

(d) means adaptable for passing a feed gas mixture to a first feed end of the adsorption vessel; and (e) means adaptable for withdrawing the less readily adsorbable component from the vessel;

wherein the regenerator is made of an encapsulated phase change material.

11. A swing adsorption system for the separation of at least one more readily adsorbable component of a feed gas mixture containing said component and at least one less readily adsorbable component comprising:

(a) at least one adsorption vessel containing an absorbent bed comprising at least one adsorbent material capable of selectively adsorbing the at least one more readily adsorbent component of the feed gas mixture;

(b) a water zone within the adsorbent bed comprising an adsorbent material which is adaptable for removing water;

(c) a regenerator section within the adsorbent bed and placed downstream of the water zone, wherein said regenerator section is adaptable for reducing any temperature rise in the adsorbent bed at such water zone;

(d) means adaptable for passing a feed gas mixture to a first feed end of the adsorption vessel; and (e) means adaptable for withdrawing the less readily adsorbable component from the vessel;

wherein the adsorbent material is a layer of activated alumina below a layer of alumina/zeolite composite.

12. A swing adsorption system for the separation of at least one more readily adsorbable component of a feed gas mixture containing said component and at least one less readily adsorbable component comprising:

(a) at least one adsorption vessel containing an absorbent bed comprising at least one adsorbent material capable of selectively adsorbing the at least one more readily adsorbent component of the feed gas mixture;

(b) a water zone within the adsorbent bed comprising an adsorbent material which is adaptable for removing water;

(c) a regenerator material section within the adsorbent bed and placed downstream of the water zone, wherein said regenerator section is adaptable for reducing any temperature rise in the adsorbent bed at such water zone;

(d) means adaptable for passing a feed gas mixture to a first feed end of the adsorption vessel; and (e) means adaptable for withdrawing the less readily adsorbable component from the vessel;

wherein the adsorbent layer comprises two layers of an alumina/zeolite composite and the regenerator material section is a layer sandwiched between said alumina/zeolite composite layers.

13. The swing adsorption system of claim 12 wherein the regenerator material is selected from the group consisting of metal, ceramic and plastic.

14. The swing adsorption system of claim 13 wherein the regenerator material has a configuration selected from the group consisting of stacked screens, spheres, crushed stones, extruded monoliths and corrugated metals, ceramic or plastics.

15. The swing adsorption system of claim 13 wherein the regenerator material is in the form of ceramic balls ranging in size from 1/16 inch to 1/2 inch.

16. The swing adsorption system of claim 12 wherein the regenerator material is solid or tubular alumina spheres sized between about 1/8 inch to about 1/4 inch.

* * * * *